US010442140B2

(12) United States Patent
Surber (10) Patent No.: US 10,442,140 B2
(45) Date of Patent: Oct. 15, 2019

(54) AWARDS TROPHY ASSEMBLY SYSTEM

(71) Applicant: Jerry Surber, Madisonville, TX (US)

(72) Inventor: Jerry Surber, Madisonville, TX (US)

( * ) Notice: Subject to any disclaimer, the term of this patent is extended or adjusted under 35 U.S.C. 154(b) by 183 days.

(21) Appl. No.: 15/286,458

(22) Filed: Oct. 5, 2016

(65) Prior Publication Data

US 2017/0156534 A1   Jun. 8, 2017

Related U.S. Application Data

(60) Provisional application No. 62/264,425, filed on Dec. 8, 2015.

(51) Int. Cl.
*B29C 65/00* (2006.01)
*A47G 33/00* (2006.01)
*F16B 11/00* (2006.01)

(52) U.S. Cl.
CPC ........ *B29C 66/1122* (2013.01); *A47G 33/004* (2013.01); *F16B 11/006* (2013.01)

(58) Field of Classification Search
CPC .......................... B29C 66/1122; A47G 33/004
USPC ......................................................... 156/293
See application file for complete search history.

(56) References Cited

U.S. PATENT DOCUMENTS

| 3,019,865 A | * | 2/1962 | Rohe | F16B 5/01 411/82 |
| 7,572,520 B2 | * | 8/2009 | Surber | A47G 33/004 428/542.4 |
| 2010/0129574 A1 | * | 5/2010 | Schwartz | A47G 33/004 428/34.1 |

\* cited by examiner

*Primary Examiner* — Christopher T Schatz
(74) *Attorney, Agent, or Firm* — Douglas Baldwin (57) ABSTRACT

An easily assembled trophy assembly system in which columns are friction fitted into slots or recesses in a base and provides for adhesives to secure the columns and bases together and alignment means to ensure proper alignment and orientation of columns on bases. The disclosed system provides attachment means to work with trophies that uses wooden, marble and composite bases.

8 Claims, 7 Drawing Sheets

AWARDS TROPHY ASSEMBLY SYSTEM

CROSS REFERENCE TO RELATED APPLICATIONS

This application claims benefit of Provisional Patent Application Ser. No. 62/264,425 filed Dec. 8, 2015, the contents and disclosure of which is incorporated herein by reference in its entirety for all purposes.

BACKGROUND

Field of the Invention

The invention pertains to assembly of awards trophies, specifically methods for friction fitting trophy columns to bases.

Background

Manufacturers and wholesalers need to be able to ship component parts to retailers and other customers that are easily assembled, customizable and efficient to ship but fully assembled trophies are awkward and expensive to ship and are not easily customized. Typical conventional trophy assemblies consists of a base, a lower lid, a column, an upper lid and a figure or other top structure symbolic of the achievement or award. Larger trophy assemblies may comprise additional columns mounted in a way to create multi-level trophies with the figure on the top with other decorative elements elsewhere in the assembly. Historically, trophies utilizing columns have been assembled using threaded rods that run through the base, the lower lid, the column, and the upper lid, and then attach to the figure using a coupler. A nut is then used to secure the base to the rod and compress the base, lower lid, column, upper lid, and figure together, thereby creating a rigid assembly.

The conventional threaded rod design has several disadvantages. One disadvantage is that the nut, threaded rod, coupler, and lids (the "hardware") contribute more than about 50% of the number of components of a typical small trophy. This impacts the cost and weight of the final assembly, increases inventory and freight expenses, and requires substantial space for inventory. More importantly, assembling even the smallest of such trophies is labor intensive, typically requiring many discrete steps, including rotations and alignments of components. Accordingly, the average awards dealer must incur high labor costs, often necessitating the hiring of part time employees and payment for numerous overtime hours, to repeatedly complete this laborious process in order to have a sufficient number of awards ready in time for awards ceremonies during peak season. These disadvantages arise primarily from the structural design being based on threaded rods and compression for structural rigidity.

U.S. Pat. No. 8,353,496 (incorporated herein by reference in its entirety) discloses a trophy assembly having a base with an integral lower clip structure, a column with interior column ribs, in which the lower clip is adapted (as by slots) to engage the column ribs, thereby joining the base and the column when the column is placed over the clip and rotated. The patent discloses a plastic base for use in a trophy assembly having a base and a column, wherein the base has in integral clip structure adapted to engage slots on the interior surface of the column. Further, the patent discloses a similar means to attach a figure (or other adornment or structure) to the top of a tubular column for use in a trophy assembly. The patent is restricted to having a connecting structure made as an integral part of a plastic base. U.S. published application 2009/0146025, for which U.S. Pat. No. 8,353,496 is a continuation-in-part application discloses basically the same system but with the attachment structure being a non-integral component attached to the base by a variety of means. The disclosed system requires an integral connection of the attachment means to the base it is limited to plastic bases and plastic bases represents only about 45% of the market.

What is needed is an inexpensive easily customizable, means to assembly trophies to allow easy customization and to provide minimum volume for shipping. The present invention is such a means.

BRIEF SUMMARY OF THE INVENTION

This invention is a trophy assembly system in which columns are friction fitted into slots or recesses in a base. It also provides for adhesives to secure the columns and bases together and alignment means to ensure proper alignment and orientation of columns on bases. Some of the advantages of the disclosed system are that it provides attachment means to work with the 55% of trophies that uses wooden, marble and composite bases. It also provides a trophy assembly that can be assembled quickly and easily without the need for the threaded rods and associated hardware.

It also provides, in some embodiments, a method of assembling trophies that eliminates the need for steps involving the use of a threaded rod.

DETAILED DESCRIPTION

In broad scope the invention is, in some embodiments, a trophy column/trophy base connecting system that relies on a friction fit between the walls of a trophy column and the walls of a recess or slot(s) in the trophy base. The system is suitable for use with polymer, metal, stone or wooden columns and with polymer, (plastic), wooden (particularly medium density fiberboard (MDF)), stone, (marble) and glass bases. Most current connecting systems are restricted to one type base material such as connecting means for stone or wooden bases or polymer bases. Most complicated systems are designed to work only with polymer bases and columns.

Figure 1A:
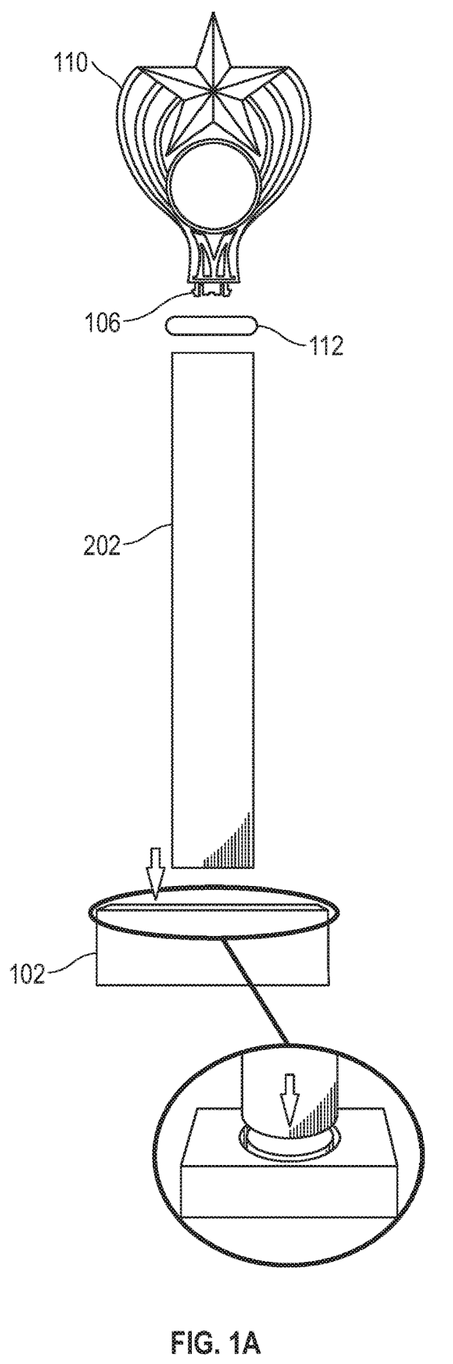
FIG. 1A is a perspective view of an assembled trophy of an embodiment of the invention.
Figure 1B:
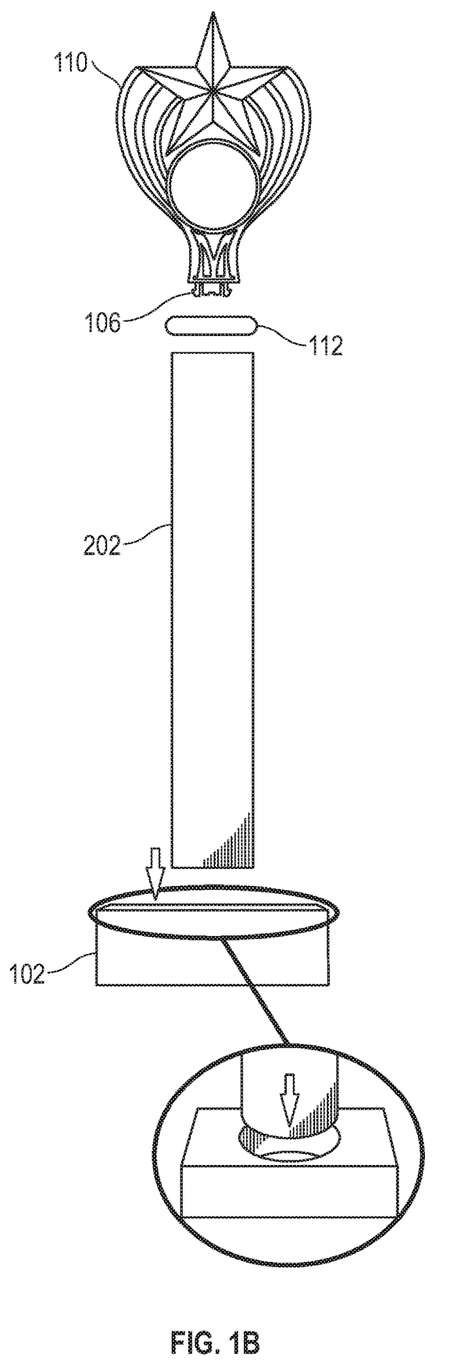
FIG. 1B is a perspective view of an assembled trophy of an embodiment of the invention.
Figure 2A:
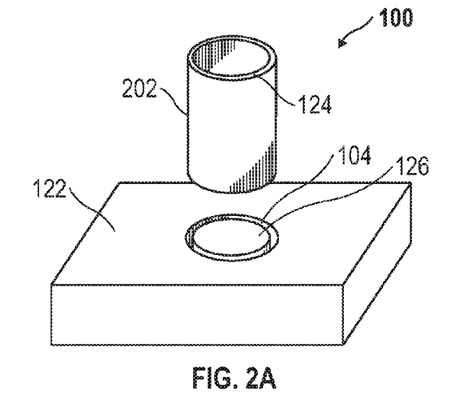
FIG. 2A is a perspective view of an embodiment of the invention showing how a column fits into a base slot.
Figure 2B:
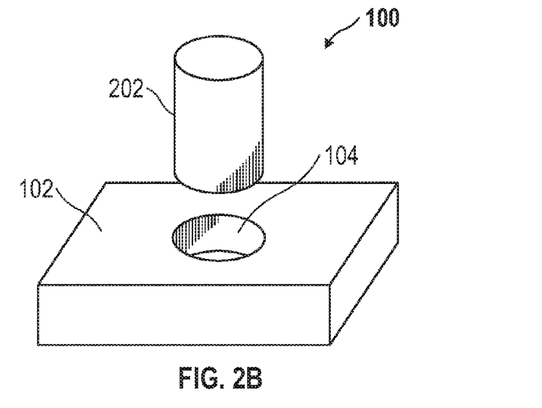
FIG. 2B is a perspective view of an embodiment of the invention showing how a column fits into a base recess.
Figure 3A:
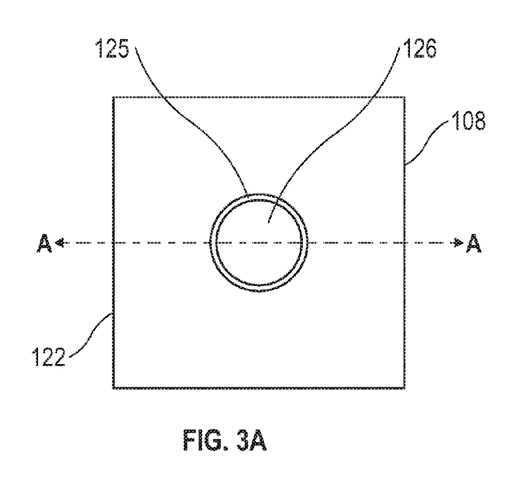
FIG. 3A is a top plan view of a trophy base of an embodiment of the invention.
Figure 3B:
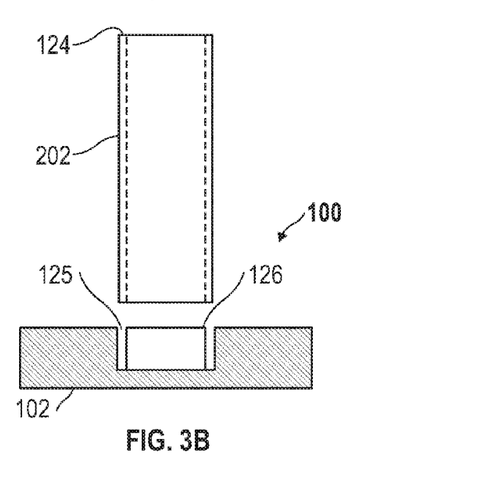
FIG. 3B is a side plan view of a trophy base and column of an embodiment of the invention.
Figure 3C:
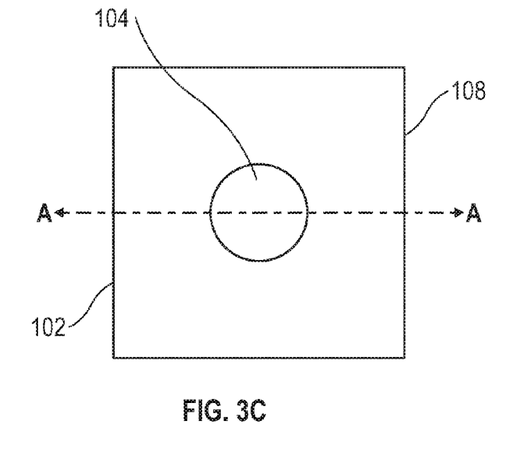
FIG. 3C is a top plan view of a trophy base of an embodiment of the invention.
Figure 3D:
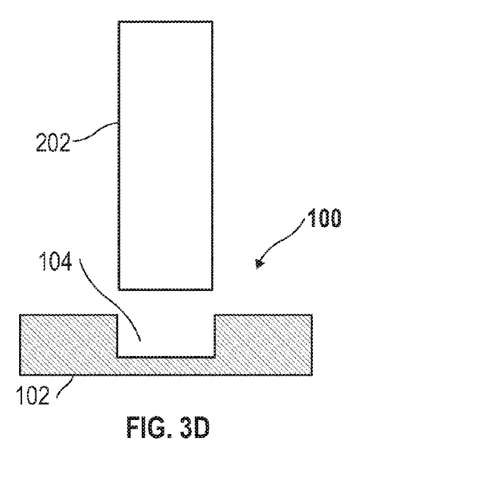
FIG. 3D is a side plan view of a trophy base and column of an embodiment of the invention.
Figure 4A:
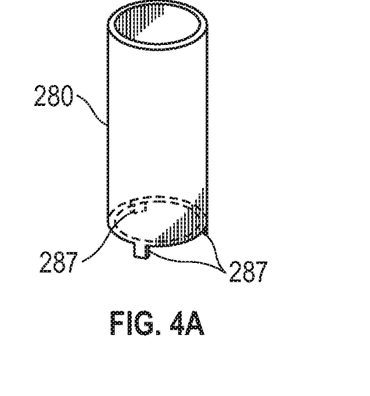
FIG. 4A is a perspective view of a column of an embodiment of the invention showing means to prevent rotation of the column.
Figure 4B:
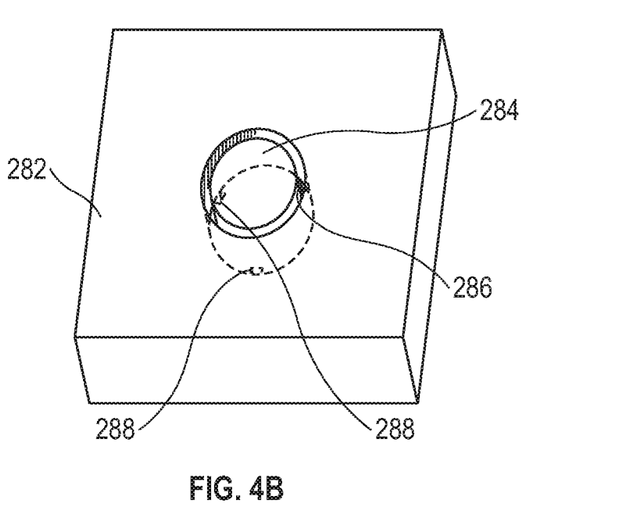
FIG. 4B is a perspective view of a base of an embodiment of the invention showing means to prevent rotation of the column.
Figure 4C:
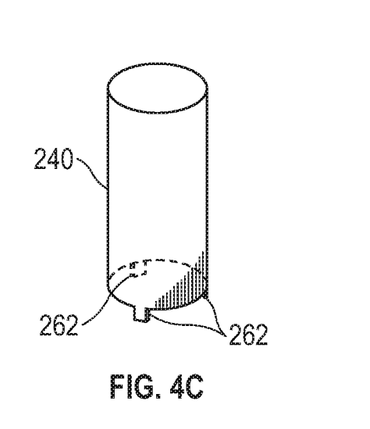
FIG. 4C is a perspective view of a column of an embodiment of the invention showing means to prevent rotation of the column.
Figure 4D:
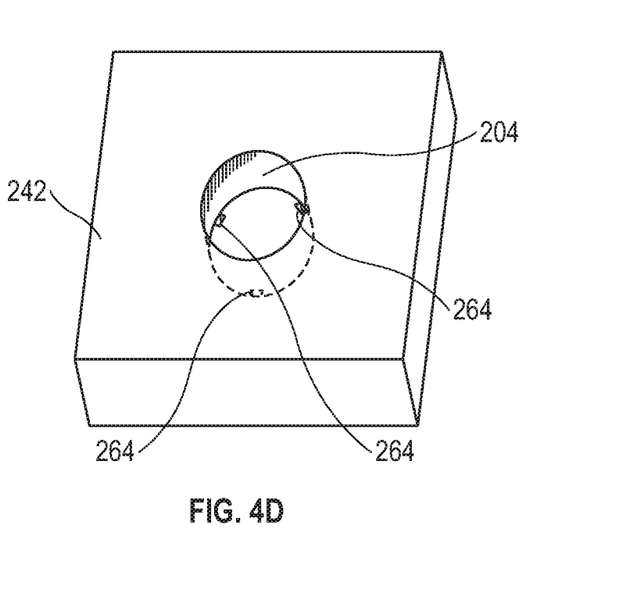
FIG. 4D is a perspective view of a base of an embodiment of the invention showing means to prevent rotation of the column.
Figure 5A:
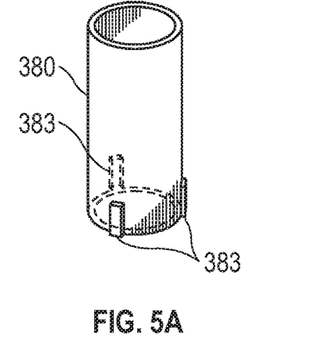
FIG. 5A is a perspective view of a column of an embodiment of the invention showing means to prevent rotation of the column.
Figure 5B:
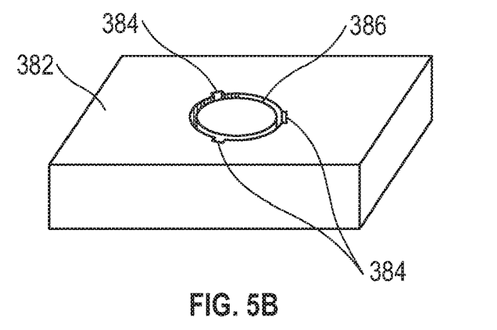
FIG. 5B is a perspective view of a base of an embodiment of the invention showing means to prevent rotation of the column.
Figure 5C:
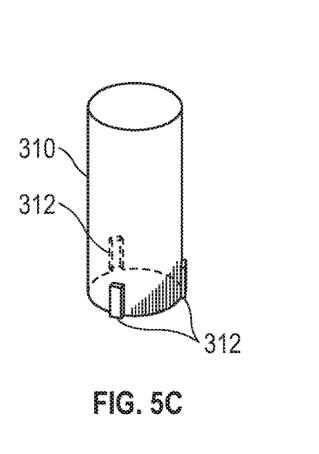
FIG. 5C is a perspective view of a column of an embodiment of the invention showing means to prevent rotation of the column.
Figure 5D:
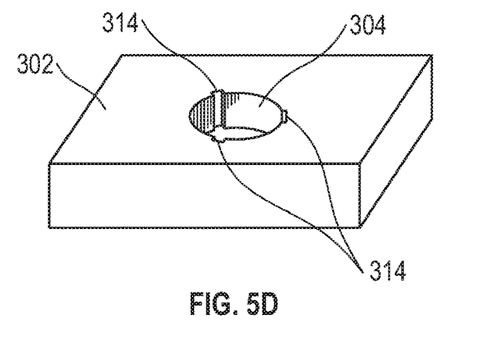
FIG. 5D is a perspective view of a base of an embodiment of the invention showing means to prevent rotation of the column.

Referring to FIG. 1B, there is illustrated a trophy of an embodiment of the invention. The trophy consists of a base, 102 a column (riser) 202 a top lid, 112, and a top figure, 110 (also known as a figurine), with a connector, 106, for connecting the figure to the lid. As illustrated the lid is friction fitted to the top of the column. The bottom of the column is friction fitted into a recess in the base, 102, as illustrated and described in FIGS. 2-7. As shown FIG. 2 the column 201 is friction fitted into recess 104 of base 102. The base may be polymer, wood, stone (such as marble) or glass. The diameter (or other dimensions if not circular) of the recess will be very slightly greater than the outside dimension of the column so the column will fit tightly into the base recess. The recess may suitably be made with computer assisted routers for wood and polymer bases. Since many columns are printed it is desirable to have means to orient the column (particularly cylindrical columns) in the base. In general, the friction fit will hold the column in the desired orientation. FIGS. 4A and 4B, 4C and 4D, 5A and 5B, and 5C and 5D illustrate other orientation means that may be needed for cylindrical columns. Non-cylindrical columns will not need special orientation means the recesses will be places in the base in position that will give the desired orientation of the column. In FIGS. 4A and 4B the column has tabs 287 spaced around the circumference of a hollow cylindrical column 280. The tabs fit into matching recesses 288 cut into the bottom of the slot 286 in base 282. In FIGS. 4C and 4D, the column 240 has tabs 262 spaced around the circumference thereof. The tabs fit into matching recesses 264 cut into the bottom of the recess 204 in base 242. In FIGS. 5A and 5B the column 380 has side projections 383 that fit into matching slots 384 cut into slot 386 in base 382. In FIGS. 5C and 5D the column 310 has side projections 312 that fit into matching slots 314 cut into recess 304 in base 302. Columns described in U.S. application Ser. No. 14/696, 770 filed May 27, 2015 have ridges inside the hollow column that are used to make suitable connections. Stops disposed in the bottom of the base recess can be used to contact these ridges to prevent turning. These internally ridged columns can also be used to facilitate a top figures (figurines) connection as described below.

FIGS. 1A, 2A, 2B, 3A and 3B (section A view of FIG. 3A), as well as FIGS. 4A and 4B, illustrate a friction fit system that has slots in the base (122 or 108) for fitting hollow columns. It is like the system with a recess but has a center structure, 126, in the recess that will contact the inside walls, 124, of a hollow columns to provide a secure friction. The width of the slots, 125, will be very slightly larger than the thickness of the hollow column walls (124) so the column can be inserted with the column inside walls in contact with the inside wall of the recess and the outside wall of the center structure. The slots may be cut into the base 122, as with a computer guided router or the slots may be constructed by providing a recess in the base (as in the embodiments with recesses) and disposing a center structure (126, 284 and 386) in the recess (forming slot 286 in FIG. 4B). The center structure may be made of the same material as the base or of different material. For example, a wooden base may have a polymer center structure, or a stone base may have a polymer or wooden center structure. All combinations are within the scope of the invention. The use of different material for the center structure can have some advantages in providing a secure fit and in structural variation. Using a separate center structure make it easier to tailor the structure to specific needs. Cutting a slot in the base as shown, for example, in FIGS. 2A and 2B (showing base and column assembly 100) is the simplest and most expedient means of providing the friction fit but makes it more difficult the configure the center structure with specific features. With a separate structure the center structure can be made with a taper to be smaller at the top than at the bottom, it can have a rounded top structure, it can be the height so that the top is level with the top of the base or it may be taller or shorter than the recess in the base. A center structure somewhat taller than the recess depth can have advantages. Separate center structures can be attached to the bottom of the recess by any suitable means—it can be glued to the base with adhesive, secured with screws or bolts, pegged or any other like means. The center structure may be solid or hollow. Polymer center structures can be made with side grooves (or slots) for disposing pressure sensitive adhesive. There may be slotted (slits cut into sides) or split structures to allow them to be compressed to accept a hollow column but circumferentially expand to securely contact the inside column wall. The center structure can also have grooves configured to accept the ridges shown on the inside walls in columns disclosed in U.S. application Ser. No. 14/696,770 filed May 27, 2015, the disclosure and Figures of which are incorporated herein by reference.

FIGS. 5A through 6B illustrate means to aid in securing the column into a base by a pressure sensitive adhesive ring (tube or the like) 146 disposed in the bottom to the recess 144 in base 142. When the column is inserted it contacts the pressure sensitive adhesive and spreads the adhesive over the bottom and sides of the recess. When set the column is securely attached to the base. This is particularly effective with solid columns (as opposed to hollow tube columns) such as those illustrated in FIG. 8 as well as FIGS. 2B, 3C, 3D, 4C, 4D, 5C, 5D, and 6B. Alternatively, pressure adhesive or pressure adhesive tape may be wrapped around the bottom section of the column or attached to the walls of the recess to secure the base/column connection. Pressure sensitive adhesives are well known and many types are described and are available from such suppliers as Nova Film USA—see web site www.novafilmsusa.com. The friction fit may also be tightened by shims pushed between the column wall and the recess walls. Similar rings of adhesive will be suitably disposed in the bottom of the slots of slotted bases.

Figure 6A:
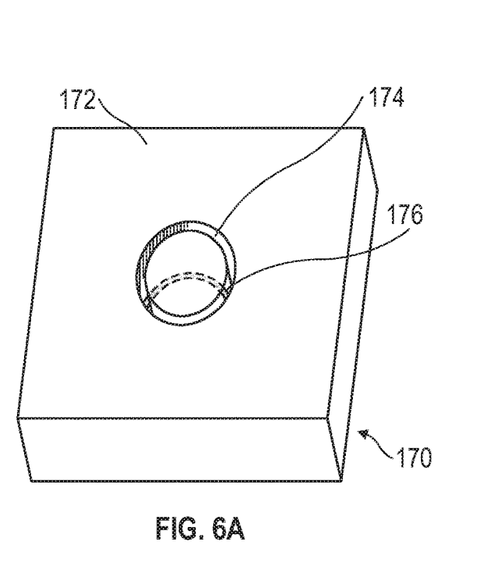
FIG. 6A is a perspective view of a base of an embodiment of the invention showing an adhesive ring in the base recess bottom.
Figure 6B:
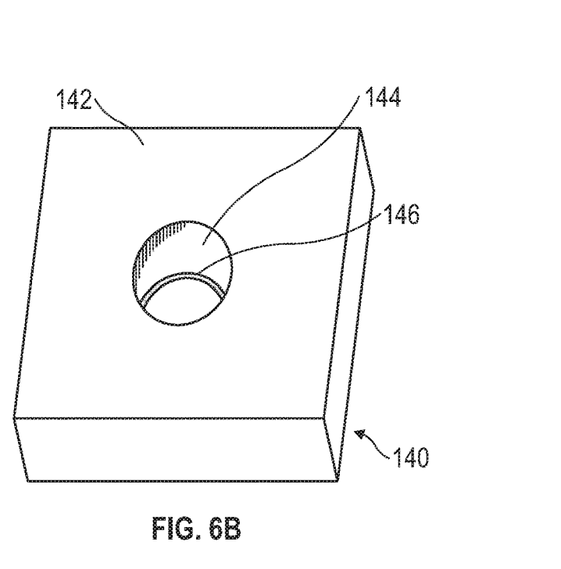
FIG. 6B is a perspective view of a base of an embodiment of the invention showing an adhesive ring in the base recess bottom.
Figure 7A:
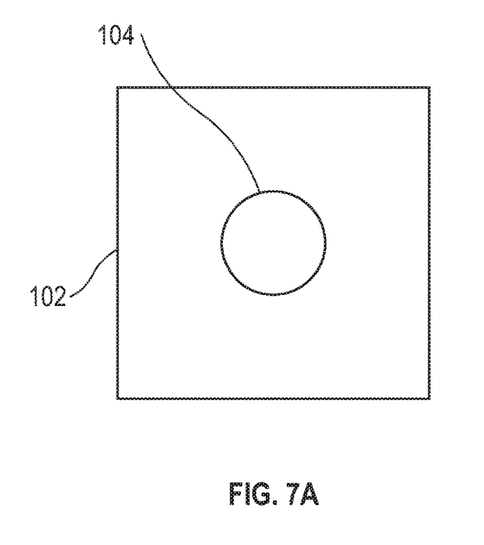
FIGS. 7A-7D are top plan views of various configurations of base recesses.
Figure 7B:
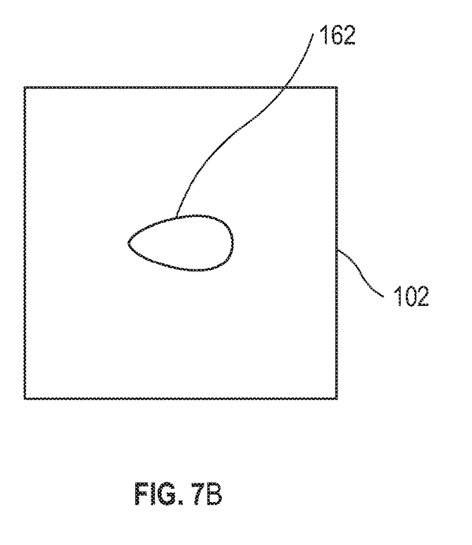
Figure 7C:
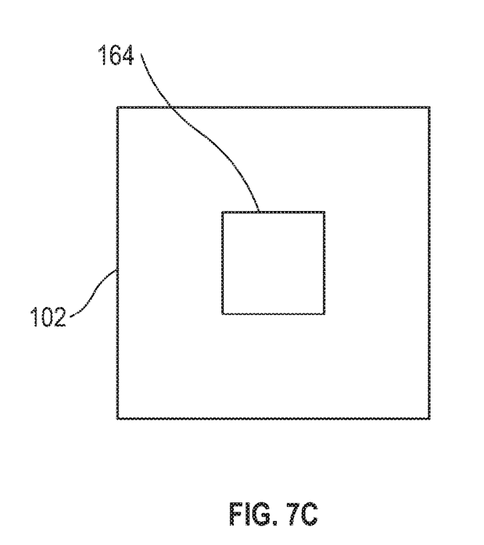
Figure 7D:
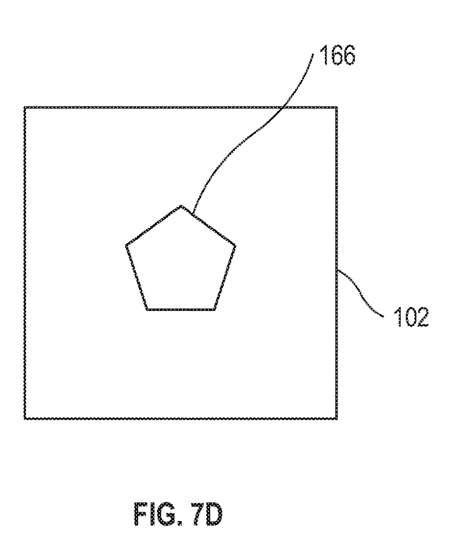

As shown in FIGS. 4A and 4B there are positioning aids 287 in column 280 and positioning aid 288 in base 282. Similarly in FIGS. 4C and 4D there are positioning aids 262 in column 240 and Similarly in FIGS. 5A and 5B there are positioning tabs, 383, and tab recesses, 384, in base 382. The column 380 fits into slot 386 and is held in proper position by the tabs and tab recesses. FIG. 6A shows base 170 with slot 174 in base 172 with pressure sensitive adhesive 176 in the bottom of the slot. FIG. 6B shows base 140 with recess 144 in base 142 with pressure sensitive adhesive 146 in the bottom of the recess.

The columns described above are generally hollow cylinders, but they do not have to be so. They may be solid cylinders such as wood, polymer, glass or stone. Moreover, columns come in a variety of shapes and friction fit connections of the present invention can easily be adapted for alternatives shapes. Some shapes are shown in FIGS. 7A-7D, showing bases 102 with a circular recess 104 in FIG. 7A, a teardrop recess 162 in FIG. 7B, a square recess in FIG. 7C, and a pentagonal recess 166 in FIG. 7D. These are illustrative only and not intended to be exclusive of the many shapes available. These shapes are illustrative of bases with a recess but also show the general outside configurations of slotted bases (but do not show the center structure).

Figure 8:
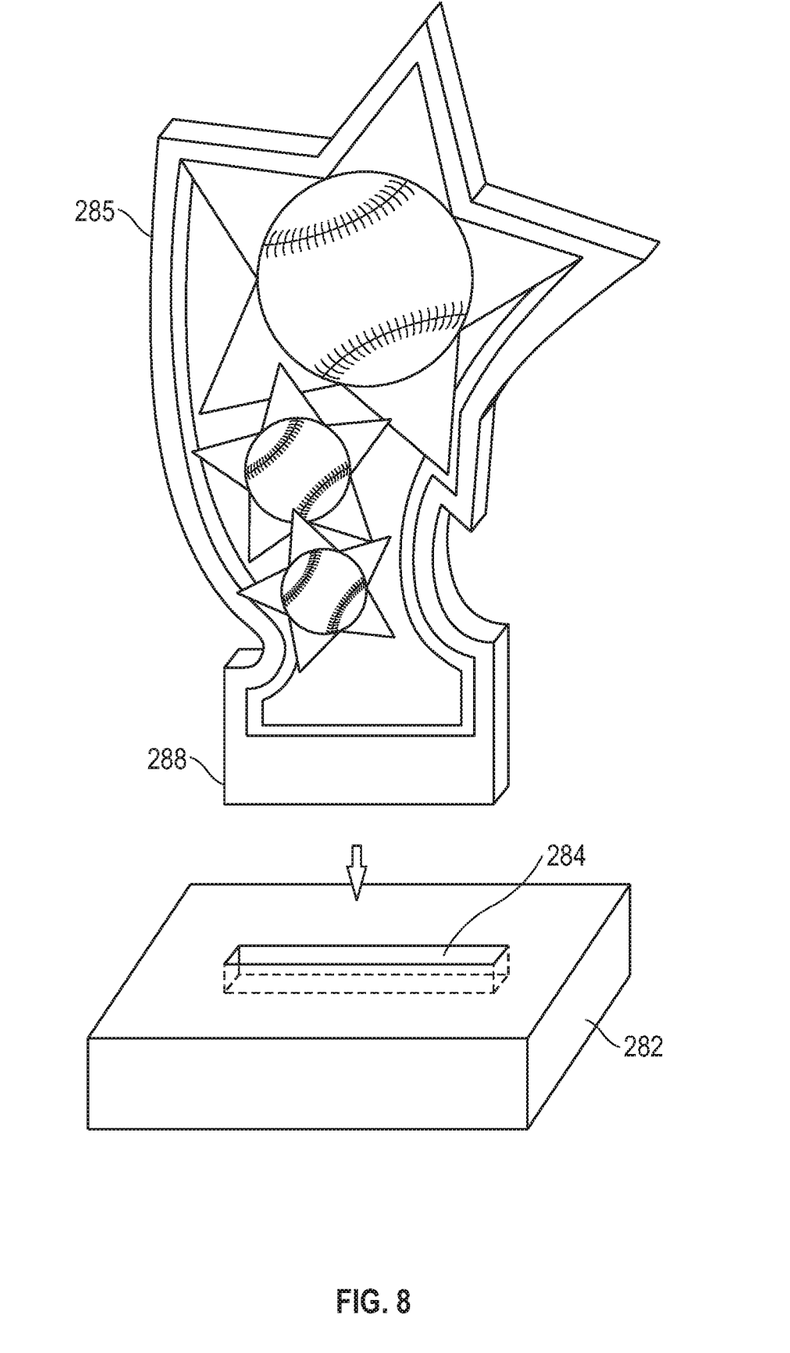
FIG. 8 is a perspective view of a flat trophy assembly of an embodiment of the invention.

The friction fit connection works particularly well with flat wooden, polymer or acrylic trophies as illustrated in FIG. 8. In these type trophies pressure sensitive adhesive can be applied into the bottom surface of the recess. Referring to FIG. 8 the flat trophy 285 has a bottom section 288 with straight sides and walls that fit into recess 284 in base 282. Printing and construction of flat wooden trophies are disclosed in U.S. application 62/213,023 filed Aug. 1, 2015, the disclosure of which is incorporated herein by reference. Flat trophies of clear near transparent, acrylic trophies are disclosed in U.S. Pat. No. 6,042,904, issued Mar. 28, 2000, the disclosure of which is incorporated herein by reference. Such trophies can also be made of glass. The connection means of these disclosed connection means are restricted to polymer bases.

The top of the column (riser) will generally have a lid (cap) 112 that may be friction fitted on the column together with a suitable connector 106 for a top figure or figure(s), 110. Suitable connectors are those disclosed in U.S. Pat. No. 7,572,520, issued Aug. 11, 2009, the disclosure of which is incorporated herein by reference. Other suitable connectors for the top of the column are disclosed in US 2011/0165349 published Jul. 7, 2011 and in U.S. application Ser. No. 14/696,770 filed May 27, 2015.

Figure 9:
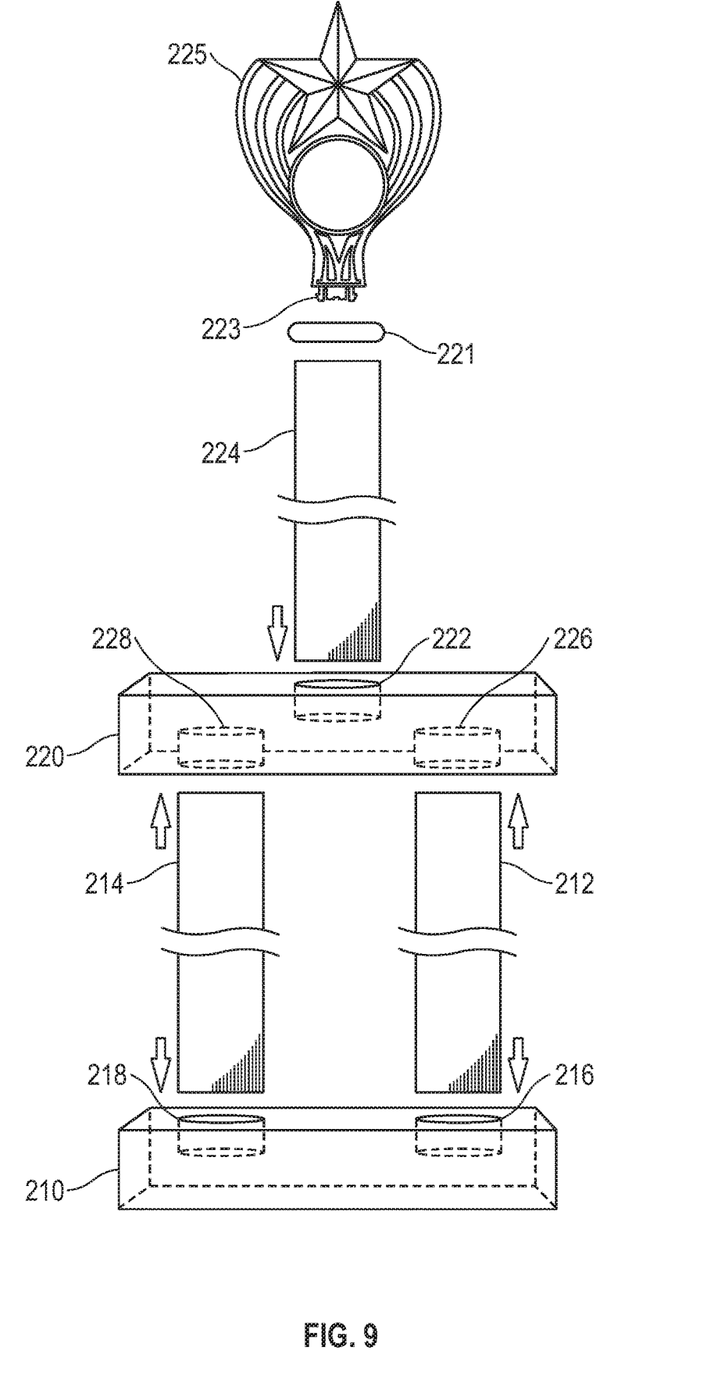
FIG. 9 is a perspective view of a multi-column assembled trophy of an embodiment of the invention.

FIG. 9 illustrates a multicolumn trophy. The lid (or topper) is a solid structure into which two columns 212 and 214 are friction mounted in base 210 in recesses 216 and 218 and in recesses in the bottom of the topper. The lid is structured much like another base on which to mount additional columns (risers) the top of the columns 212 and 214 that may be friction fitted into recesses 226 and 228 in the bottom of the topper structure 220. Optionally, additional column(s) 224 may be mounted on top of the structure into recess(es) 222 in the top of the topper structure 220 in the same manner as connecting the column to the base as described herein. The top figure will be mounted as described for FIG. 1 with the top FIG. 225 connected by connector 223 to a top lid 221. It will be apparent (without need for additional drawings) that the friction fits of (for fit with recesses) will also be suitable where the base and top structure are made with slotted friction fit configuration as explained above for single column trophies.

The columns may be supplied in standard lengths (such as 24 or 36 inch) and customized by the dealer/user by cutting to any desired length. For those columns with special orientation fitting the top would be cut to obtain a desired length.

The invention is also, in some embodiments, a kit comprising a base with precut recess or slots, a column of matching shape and optionally a lid, top figure and suitable connector. For some embodiments there is provided a base with recess and center structure. For multiple tier trophies the kit may contain the requisite number of columns, a base with appropriate recesses, and a topper also with appropriate recesses on top and bottom and a top lid and figure for the topmost column(s).

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

The invention claimed is:

1. A method of connecting a column of an awards trophy to a base comprising:
   (1) providing a trophy base having a top surface and a bottom surface, and at least one cavity being a recess, beginning at the top surface and extending downwards towards the bottom surface, and defining at least a cavity outer wall surface;
   (2) providing a column comprising a bottom section, and at least the bottom section having a column outer wall surface; and
   (3) pressing the bottom section of the column straight into the cavity of the base;
   and wherein:
   (a) the cavity outer wall surface and the column outer wall surface are of a size and shape such that contact therebetween creates a secure friction fit therebetween when the bottom section of the column is inserted into the cavity; and
   (c) no threaded rod is required to secure the bottom section of the column into the base;
   and wherein:
   (i) the column is hollow such that at least the bottom section of the column has a column inner wall surface;
   (ii) the cavity has a removable center structure disposed therein; and
   (iii) the removable center structure and the column inner wall surface are of a size and shape such that friction therebetween augments the secure friction fit when the bottom section of the column is inserted into the cavity.

2. The method of claim 1 wherein there is pressure sensitive adhesive disposed in the recess or on the column outer wall surface.

3. The method of claim 1 wherein the column is cylindrical and there is provided orientation means to orient the column in the base in a predetermined orientation and to prevent the column from turning relative to the base.

4. The method of claim 1 wherein the trophy base has at least one additional cavity and there is provided at least one additional column.

5. The method of claim 1 wherein the cavity does not extend to the bottom surface of the base, and the removable center structure is attached to a bottom of the cavity.

6. The method of claim 2 wherein the pressure sensitive adhesive is film applied to at least some portion of the column outer wall surface.

7. The method of claim 1 wherein the base is a polymer base.

8. The method of claim 1 wherein the base is a wooden base and step (1) further comprises providing the cavity in the base with a router.

* * * * *